US006807216B1

(12) United States Patent
Hilliard (10) Patent No.: US 6,807,216 B1
(45) Date of Patent: Oct. 19, 2004

(54) CIRCULAR LASER

(76) Inventor: Donald Bennett Hilliard, 3050 N. Fontana, Tucson, AZ (US) 85705

( * ) Notice: Subject to any disclaimer, the term of this patent is extended or adjusted under 35 U.S.C. 154(b) by 0 days.

(21) Appl. No.: 09/839,254

(22) Filed: Apr. 20, 2001

Related U.S. Application Data (60) Provisional application No. 60/236,446, filed on Sep. 29, 2000.

(51) Int. Cl.[7] ............................. H01S 3/06; H01S 3/07
(52) U.S. Cl. .............................. 372/66; 372/39; 372/67
(58) Field of Search ............................. 372/39, 66, 67, 372/98, 102, 70, 85

(56) References Cited

U.S. PATENT DOCUMENTS

| | | | | |
|---|---|---|---|---|
| 3,887,882 A | * | 6/1975 | Smith | 372/83 |
| 4,615,034 A | * | 9/1986 | von Guten | 372/99 |
| 4,783,789 A | | 11/1988 | Higgins | |
| 4,829,537 A | * | 5/1989 | Baer | 372/66 |
| 4,925,259 A | * | 5/1990 | Emmett | 359/359 |
| 4,945,547 A | * | 7/1990 | Greene | 372/94 |
| 5,226,054 A | | 7/1993 | Yarborough | |
| 5,357,591 A | | 10/1994 | Jiang | |

FOREIGN PATENT DOCUMENTS

WO        WO9713302 A1    4/1997

OTHER PUBLICATIONS

M.A. Kaliteevski et al. "Bragg reflectors for cylindrical waves," Journal of Modern Optics. Apr. 15, 1999. Pp 875–890. v 46. n 5. Taylor & Francis Ltd, UK.*

R.K. Lee, et al. "Photonic bandgap disk laser", Electronics Letters, Apr. 1, 1999, p569–570, 35, n. 7, IEEE Stevenage England.

D. Labilloy, et al. "Microdisks with circular photonic bandgap boundaries exhibiting high–quality low–order modes". CLEO Europe, Sep. 14–18, 1998 Glasgow, p 142, IEEE Piscataway, NJ, USA.

Ping, E.–X. "Transmissin of planar, cylindrical and spherical multiple dielectric layer systems," Electronics Letters, Oct. 14, 1993, p 1838–1839, v 29, n 21, IEEE, USA.

M.A. Kaliteevski, et al, "Bragg reflectors for cylindrical waves", Journal of Modern Optics, Apr. 15, 1999, p 875–890, v 46, n 5, Taylor & Francis Ltd, UK.

\* cited by examiner

*Primary Examiner*—Don Wong
*Assistant Examiner*—Leith Al-Nazer (57) ABSTRACT

A novel laser apparatus is disclosed which pertains to laser resonator geometries possessing circular symmetry, such as in the case of disk or spherical lasers. The disclosed invention utilizes multi-layer dielectric (MLD) thin film reflectors of many layer pairs of very small refractive index difference, the MLD deposited on a surface of revolution, thereby forming an optical cavity. These dielectric reflectors are disposed in such a way as to allow selection of preferred low order modes and suppression of parasitic modes while allowing a high cavity Q factor for preferred modes. The invention disclosed, in its preferred embodiments, is seen as particularly useful in applications requiring high efficiency in the production and coupling of coherent radiation. This is accomplished in a cavity design that is relatively compact and economical.

22 Claims, 7 Drawing Sheets

CIRCULAR LASER

This application claims the benefit of Provisional application No. 60/236,446, filed Sep. 29, 2000.

BACKGROUND OF THE INVENTION

1. Field of the Invention

The present invention relates generally to the field of mode discrimination means in laser cavities, and in particular, mode discrimination in macroscopic cavities wherein a vast number of modes may otherwise be sustained.

2. Description of the Related Art

The present invention relates generally to the field of lasers and optical resonator design, and in particular, to the fields of disk and spherical lasers. Also, the invention relates to cavity structure designs that utilize multi-layer dielectric (MLD) thin film reflectors that provide a high degree of mode selection.

Laser cavities of the disk and spherical geometries have become an increasingly intensive field of research; in particular, for such lasers that are fabricated on a miniature or microscopic scale. In the latter case, the predominant means of cavity reflection is through total internal reflection (TIR), which provides an extremely high cavity Q. Such reflective means normally manifest in "whispering modes," which propagate at angles below the critical angle for TIR. These microdisk and microsphere lasers are very effective in cases involving evanescent coupling to an adjacent dielectric structure; however, they are known to contain a very large number of competing high-order modes.

In addition, the coupling of these whispering modes for useful work is difficult for applications not utilizing evanescent coupling.

In recent years, theoretical studies have been performed on the development of derivation methods for cylindrical and spherical multilayer structures, which are aimed at providing an accurate description of the reflection coefficients and modal characteristics of these cavities. These studies address circular confinement structures with cavity dimensions on the order of the wavelengths studied. However, none of these studies are found to address the issues of applying similar circular Bragg reflectors for larger cavities of the scale used for gas and larger solid state cavities. Furthermore, these previous studies also entertain only the use of conventional MLD filters, with a large real refractive index difference, $n_H - n_L = \Delta n > 1$, for the layer pairs, and with an accordingly small number of layers required for high reflection.

The use of interference structures to enable high spectral resolving power in reflecting coatings has been described by Emmett (U.S. Pat. No. 4,925,259), wherein a very large number of alternating dielectric layers possessing a very small difference in refractive indices is used for application in high power flashlamps. The described coatings are utilized primarily for providing a high damage threshold to the high irradiance experienced in the flashlamp enclosure, as well as for obtaining a well-resolved pump wavelength for use in the described flashlamp.

The control of transverse modes in semiconductor lasers, primarily VCSEL's, has been reported by several research groups in the last decade. These latter reports utilize a circular Bragg grating structure as a complement to the planar Bragg mirrors of a conventional, high Q semiconductor cavity. Such circular Bragg gratings do not form the initial resonant cavity, but rather, aid in controlling relatively low Q, transverse modes of an existing Fabry-Perot structure. In such cases, the resultant control of transverse propagation may allow lowered thresholds, or enhanced stability.

Earlier, large-scale, laser designs of a circular geometry operated on very different principles than the microlasers, utilizing primarily gas laser mediums and metallic reflectors. In these earlier designs, optical power could be coupled for useful work at the center of the cavity, such as for isotope separation, or by using a conical reflector. Since, in these latter cases, laser modes that concentrated energy at the cavity's center were needed, some means for blocking the whispering-type modes was generally required. Such mode suppression was usually accomplished through radial stops; however, these stops only provided the most rudimentary mode control, in addition to hampering the efficient operation of the laser. Because of such issues, disk and spherical lasers have not supplanted standard linear lasers for any applications requiring substantial optical power or a high degree of mode selection.

SUMMARY OF THE INVENTION

A novel laser apparatus has been developed for use in such applications as lasers and light amplifiers in general. The laser developed comprises a cavity mirror structure that provides a single surface of revolution. The cavity volume is defined by this surface of revolution, and contains the gain medium. Unlike prior art disk and/or spherical lasers possessing circular cavities, the present invention does not rely on total internal reflection (TIR) or metallic reflectors to provide a high cavity Q-factor (and a broad range of high-order modes). The laser design of the present invention avoids use of these cavity confinement methods. In the optical resonator of the present invention, interference-based multilayer dielectric (MLD) reflectors are constructed that can possess unusually narrow reflection peaks, corresponding to a degree of finesse (finesse designating interference-based resolving power) usually associated with MLD transmission filters of the Fabry-Perot type. The high-finesse MLD reflectors of the present invention conform to the surface of revolution of the cavity mirror structure, allowing a high degree of angle-dependence for selective containment of cavity modes. These filters are disposed in such a way as to allow preferred-low order modes (lower order modes being represented in the present disclosure as those corresponding to near normal incidence radiation) and suppression of parasitic modes while allowing a high cavity Q factor for the modes selected.

For a multi-layer dielectric (MLD) coating consisting of alternating layers, where all layers have an optical thickness equal to a quarter-wave of light at the wavelength of interest, the reflectance may be described according to:

$$R = \left[ \frac{1-(n_H/n_L)^{2p}(n_H^2/n_L)}{1+(n_H/n_L)^{2p}(n_H^2/n_L)} \right]^2 \quad (1)$$

wherein the index of refraction for the substrate is $n_s$, the two layer indices are $n_H$ (high index) and $n_L$ (low index), and the number of pairs of alternating layers is p. As is evidenced by equation (1), a higher reflectance may be achieved through the implementation of a greater difference in refractive index $\Delta n = |n_2 - n_1|$. High reflectance is thus normally achieved by maintaining $\Delta n$ at a relatively high value. However, as equation (1) suggests, high reflectance may also be achieved by depositing many layer pairs possessing a relatively low difference in their refractive indices. As the index difference decreases, many more pairs of alternating layers must be deposited to maintain reasonable reflectance. At the same time, this latter approach will result in a decrease in the bandwidth of light reflected by the resultant coating. The present invention utilizes MLD coatings which obtain high reflectance from an unusually low Δn; this is accomplished by maintaining a high degree of control over the properties of each layer through an unusually high number of iterations, p, of the layer pair. With well-controlled film characteristics, the reflectance of the resulting MLD coating is found to have a quite narrow bandwidth, typically in the order of nanometers.

A characteristic of the MLD coatings utilized in the present invention is the angle-dependence of the reflection peak. As the MLD coating is irradiated at increasingly oblique angles of incidence, the spectrally narrow reflection peak will be shifted toward increasingly shorter wavelengths. While the degree of this latter peak shift will depend on such issues as phase dispersion and the change in optical admittance with increasingly oblique incidence, the fractional shift in the peak transmittance will change generally with the phase thickness shift. As such, the fractional shift in peak transmittance will be slightly less than cos θ, where θ is the angle from normal incidence. As the angle of incidence, θ, increases, the magnitude of the reflectance peak will generally decrease, as well.

The aforementioned characteristics of these high-finesse MLD coatings are utilized in the preferred embodiments of the present invention. In accordance with the illustrated preferred embodiments, a novel laser cavity structure is disclosed herein that effectively utilizes the sensitivity of the aforementioned coatings to angle-of-incidence when these same coatings are irradiated with quasi-monochromatic light. This is normally accomplished through the use of a cavity mirror that conforms to a single surface of revolution. High confinement is achieved through novel use of the highly angle-dependent MLD reflectors. Thus, instead of utilizing TIR or metal films, which both provide wide acceptance angles to high order cavity modes, the present invention utilizes external reflection and narrow acceptance angles to increase the stability of selected, lower order, cavity modes.

Because the present invention does not rely on TIR or metallic films to provide high confinement for various laser modes, it is designed with a fundamentally different set of requirements for the refractive indices of its individual components. In contrast to the disk and spherical lasers of the prior art, the gain medium—or, equivalently, the volume in which it resides—in lasers of the present invention should possess an effective refractive index, $n_G$, lower than that of the immediately surrounding medium. As such, the high index layers of the MLD of the present invention must have a refractive index, $n_H$, greater than that of the gain volume.

In one preferred embodiment, the present invention provides a laser cavity structure that does not require a partially reflective mirror or external optics to efficiently couple laser light to a work piece or various process media. Instead, the laser cavity structure disclosed herein allows photoabsorbing media to be introduced through the center of the cavity, so that energy not absorbed by the photo-absorbing media may contribute back to the energy stored inside the cavity. According to this aspect, the irradiation of photoabsorbing media may also be rendered highly uniform, and is well suited for media of substantially circular symmetry.

In another embodiment, the invention provides a unique configuration for coupling laser radiation from the edge of the spherical and disk lasers described, as the mode selection provided allows efficient coupling of a low-divergence beam from the cavity edge. Other objects of the present invention follow.

One objective of the present invention is to provide a laser cavity structure that allows high thermal stability.

Another objective of the present invention is to provide a disk or spherical laser cavity structure that discourages the establishment of whispering modes Another object of the present invention is to provide a laser cavity structure which allows mode selection through the use of all-dielectric reflectors of unusually high finesse.

Yet another object of the present invention is to increase the stability of conventional laser cavity structures through the suppression of walk-off modes.

Another object of the present invention is to provide a laser cavity structure that allows a low threshold to lasing.

Another object of the present invention is to provide a means for irradiating a photo-absorbing medium from a continuous 360-degree periphery.

Another object of the present invention is to provide a laser cavity structure that allows efficient and reliable mechanical design.

DESCRIPTION OF THE PREFERRED EMBODIMENTS

The following description and FIGS. 1 through 7 of the drawings depict various embodiments of the present invention. The embodiments set forth herein are provided to convey the scope of the invention to those skilled in the art. While the invention will be described in conjunction with the preferred embodiments, various alternative embodiments to the structures and methods illustrated herein may be employed without departing from the principles of the invention described herein. Like numerals are used for like and corresponding parts of the various drawings.

Figure 1:
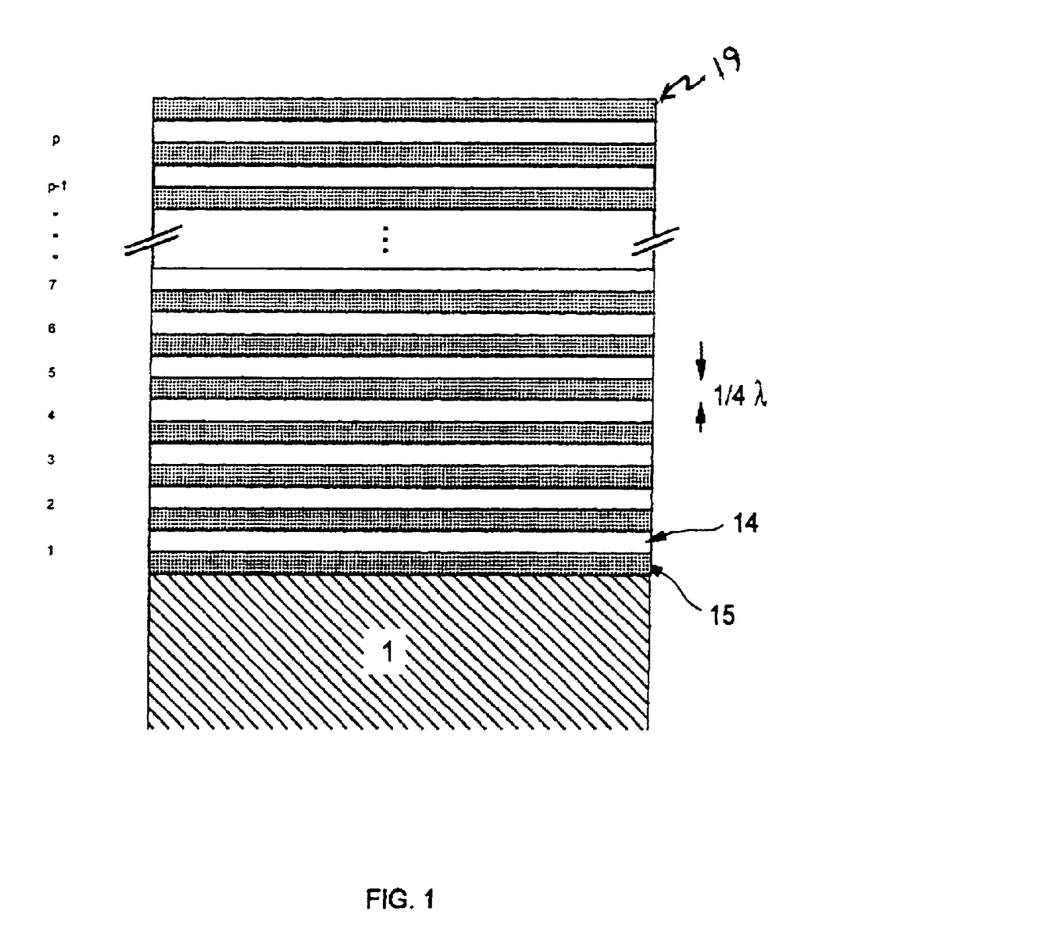
FIG. 1 is a delimited cross-sectional view of a thin film design for a MLD used in the preferred embodiment.

In FIG. 1 is a repeated scheme for the build-up of a high-reflectance MLD. The MLD contains p quarter-wave pairs, each consisting of a low index layer (14) and a high index layer (15). The substrate (1) provides the surface of revolution onto which the MLD is deposited, thus forming the gas cavity laser referred to in FIGS. 3–7. Each pair of quarter-wave layers (14) and (15) share a small refractive index difference, Δn, which is typically less than 0.2. The number of quarter-wave pairs, p, will typically be greater than 50 to maintain high reflectance. The quarter-wave pairs may be deposited sequentially to achieve MLD's containing hundreds of layers. Materials used will depend upon the spectral region desired for lasing action. In many cases the small difference in real refractive index, $\Delta n$, may be achieved by making substitutions into the matrix of a parent material. For instance, $ZrO_2$ may be deposited as the parent material by ion beam sputtering, thereby forming one of the quarter-wave layers. Subsequently, the second layer material may then be formed using the same process, while co-sputtering a second material, such as $TiO_2$, from a separate target in the same process chamber, resulting in the second layer being a mixture of the two oxides. As a result, the refractive index of the second layer may be controllably rendered slightly higher than that of the first layer; this, through the well-controlled addition of $TiO_2$ to a $ZrO_2$ matrix. The MLD, as shown in FIG. 1, may also be constructed with additional thin film structures incorporated for performing additional functions, such as anti-reflection coatings or secondary reflectors, and so forth. However, to achieve the finesse required in the present invention, the MLD design chosen for the cavity mirror must incorporate a high number of quarter-wave pair iterations, accompanied by an unusually small index difference, $\Delta n$.

Figure 2:
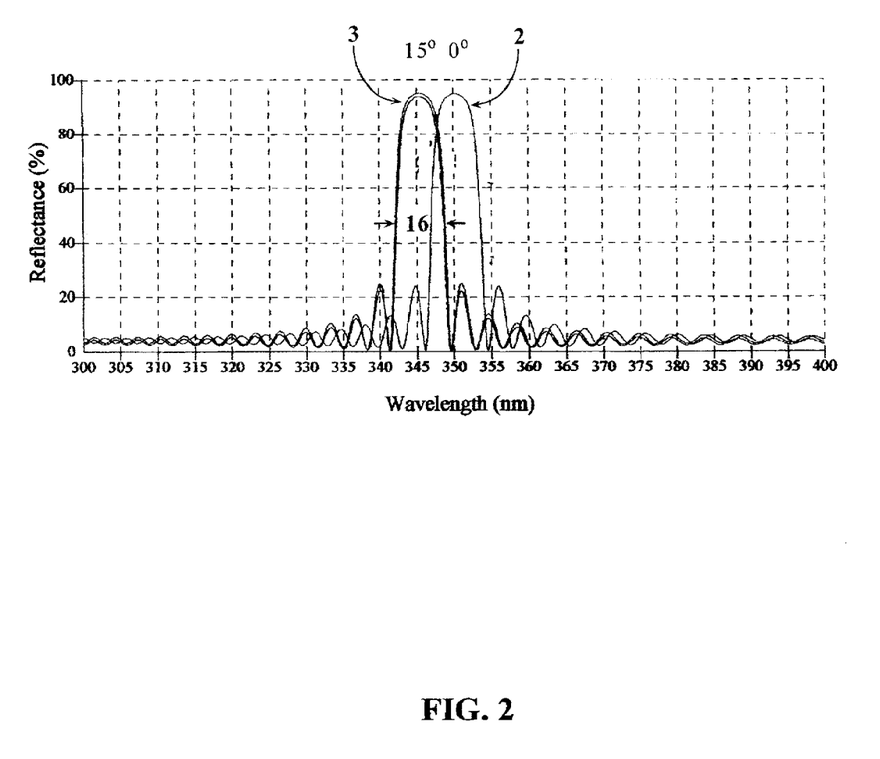
FIG. 2 is a reflectance curve for an MLD coating fabricated in accordance with the embodiments set forth in FIG. 1., showing normal incidence and tilted reflectance in the region of 300 nm to 400 nm.

In FIG. 2 are reflectance curves, in wavelength $\lambda$ vs. % reflectance, for an MLD reflector fabricated according to the design set forth in FIG. 1, for light incident approximately normal to the substrate. The reflectance peak of the MLD reflector at normal incidence, as given by the solid line (2), is an example of the narrow full-width-half-max (FWHM) achieved with low $\Delta n$. The reflectance peaks of FIG. 2 is obtained from a MLD reflector containing ninety pairs (p=90) of the quarter-wave layers, with the index difference of the pair, $\Delta n=0.04$. A topmost high-index layer (19) would typically be deposited to give maximum reflectance, resulting in an odd number of layers (in this case, 181 layers). The dashed line (3) in FIG. 2 is the reflectance peak for the same MLD reflector when irradiated with light at an angle of 15° from normal incidence. The spectral shift between the two reflectance peaks of FIG. 2 is found to be approximately $\lambda_0-\lambda_1=\Delta\lambda=5$ nm, while the magnitude of p-polarization peak reflectance is also found to drop from 95% to 94%. The magnitude of the peak reflectance may be increased through an increase in p; and, as peak reflectance increases, the latter 1% percent drop becomes an increasingly decisive factor in determining cavity Q, and mode selection, within the laser cavity. A more narrow, or broad, FWHM (16) may be obtained by varying $\Delta n$ according to the previously described relationships. In addition to the narrow FWHM, another useful characteristic of this MLD design, when incorporated in the present invention, is the pointed shape of the peak, as this pointed shape allows a more narrowly defined peak reflectance. The utility of these characteristics will become apparent when discussed in conjunction with the embodiments of FIGS. 3–7.

Figure 3:
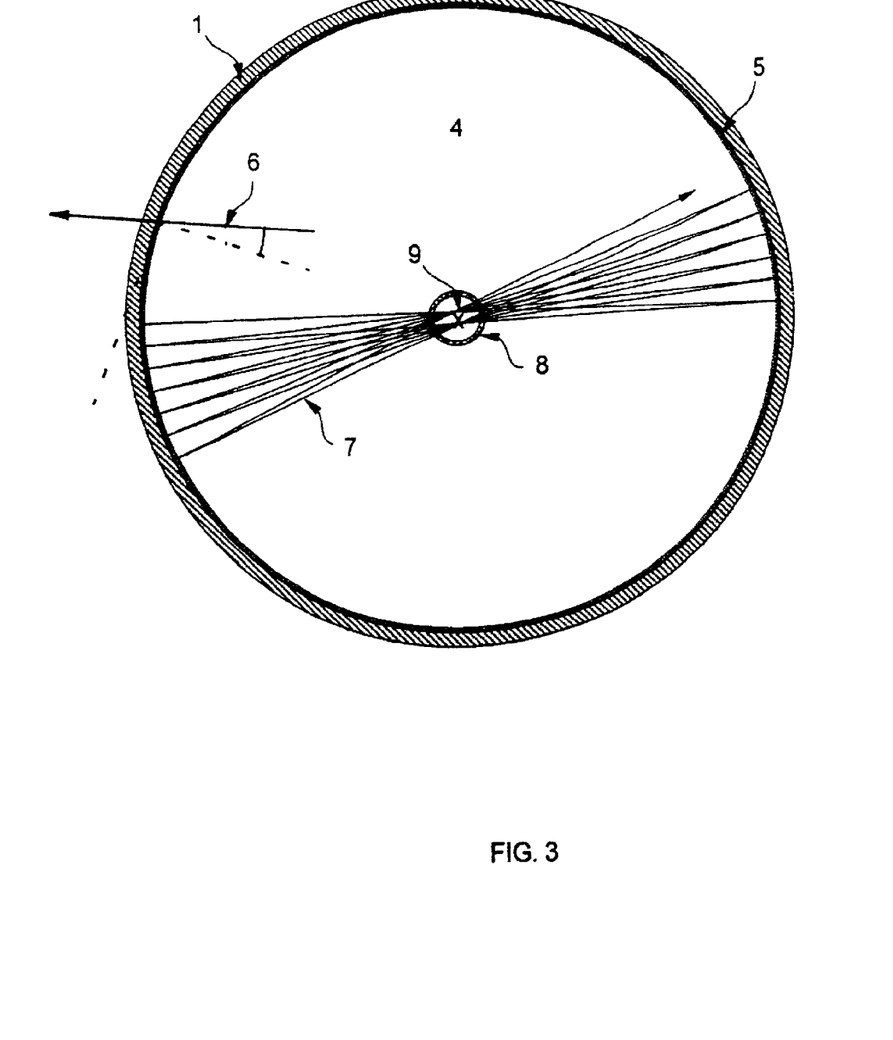
FIG. 3 is a sectional top view of the invention in its first preferred embodiment.

In FIG. 3, the present invention is shown in its first preferred embodiment. The substrate (1) provides the structure by which the surface of revolution, with axis of circular symmetry (9), is defined. In the embodiments of FIGS. 3–7, this surface of revolution will be identical to the interface between the substrate (1) and the MLD reflector (5). The MLD reflector (5), as described in FIGS. 1–2, conforms to this surface of revolution and modifies its reflective characteristics. The gain medium for the laser is contained within the cavity interior (4), formed by the substrate and integral MLD reflector. As such, if a fluorescent event occurs within the gain medium, its confinement within the cavity is very much altered through the incorporation of the previously set forth MLD. The MLD limits the bandwidth of the laser emission, first through the interference filtering of the normal incidence emission, as practiced in the prior art. However the circular geometry of the present invention, combined with the high angle-dependence of the MLD reflector, as described in FIGS. 1–2, requires that emission from the fluorescent event also propagate within a narrowly defined solid angle, if it is to be reflected back into the cavity interior (4). Propagation which occurs outside this solid angle, such as indicated by solid line (6), will be allowed to transmit outside of the cavity interior (4), thereby avoiding the establishment of laser modes for such off-angle propagation. In the geometries described, these highly angle-dependent MLD reflectors thereby become a means of mode selection. The zig-zag line (7) which depicts the direction of mode propagation is only for demonstration, but indicates that the concentration of allowed modes is at or near normal incidence. The precise angle of the dominant mode will be determined by such design considerations as the preferred angle-of-incidence, the fluorescence spectra of the gain medium, the type of coupling desired, etc.

In the laser cavity structure of the present invention, confinement of the laser modes to paths that are at or near to normal incidence allows several unique coupling configurations. One such configuration is shown in FIG. 3, wherein laser radiation is coupled from the laser by introducing the media to be processed into the center of the laser cavity. This may be accomplished through implementation of a tube (8), which separates the gain medium from the process media passing through the tube interior, thereby providing a process volume within the cavity. The latter embodiment will be particularly effective in the processing of media that possess low absorption cross-sections, such as gases and vapors. Alternatively, the central coupling structure designated by the tube (8) may instead contain a cone-shaped optical element for extraction of laser light from the center of the cavity as has been described in numerous papers and patents of the prior art.

Figure 4:
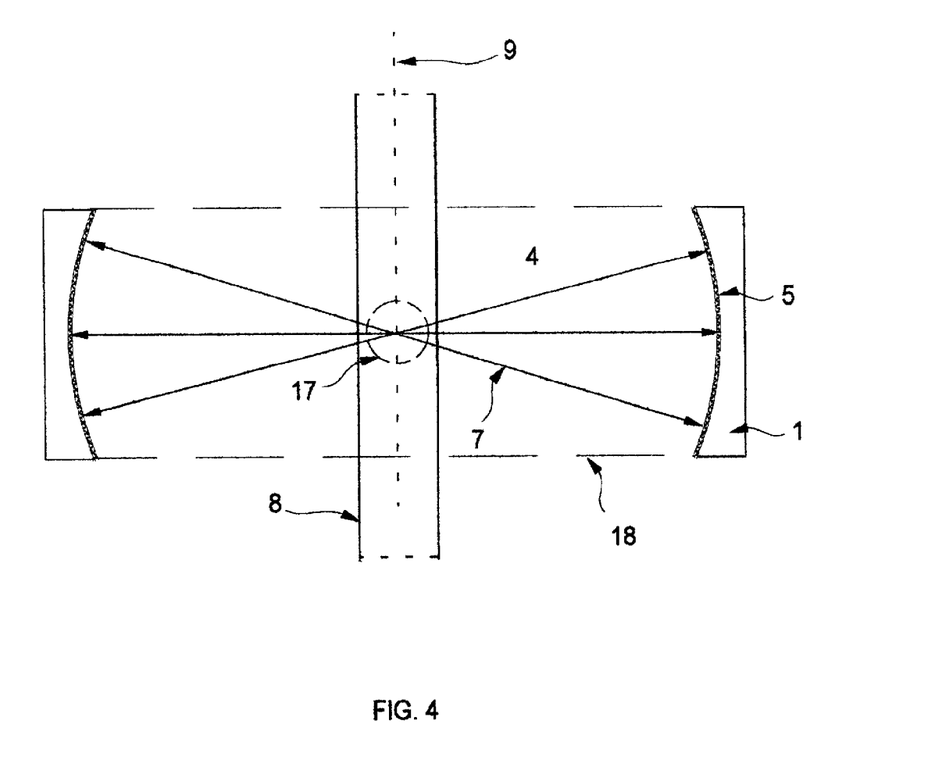
FIG. 4 is a sectional side view of the invention constructed as a spherical cavity laser.

The cross-sectional figure of the cavity mirror may be designed variously, dependent upon the type of gain medium and lasing action required. In FIG. 4, the surface of revolution possesses a cross-sectional figure with a radius of curvature equivalent to that of the surface of revolution as viewed from the top in FIG. 3, thereby rendering it a spherical section. In this embodiment, laser emission is confined to propagate through a small volume (17) located at the center of the spherical mirror, intersected by the axis of circular symmetry (9), thereby allowing an unusually high power density within this small volume.

Figure 5:
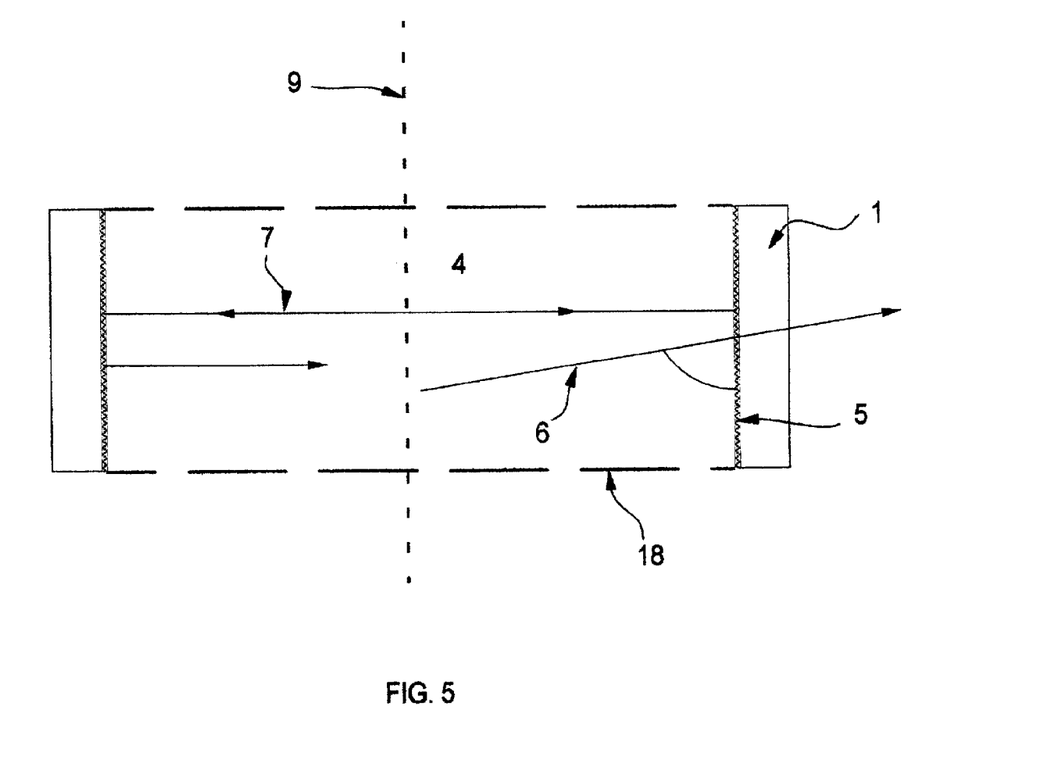
FIG. 5 is a sectional side view of the invention constructed as a cylindrical cavity laser.

Another embodiment of the present invention is presented in FIG. 5, in which the cross-sectional figure of the surface of revolution—again, identical to the MLD/substrate interface—is straight, thereby rendering the surface of revolution a cylinder. The cylindrical shape of the laser cavity structure in the latter embodiment serves to demonstrate an added utility that is realized with the incorporation of the described MLD's. Unlike the cavity geometries of the prior art, linear and other, which use relatively low-finesse reflectors, the present invention allows the stability associated with a particular cavity mirror selection to be increased. Whereas flat (or cylindrical) cavity mirrors will typically support parasitic "walk-off" modes which can decrease the overall Q-factor of the laser cavity, these same modes, such as exemplified by propagation direction (6) in FIG. 5, will be discouraged due to the low reflectivity of the cavity mirrors at these angles.

Figure 6:
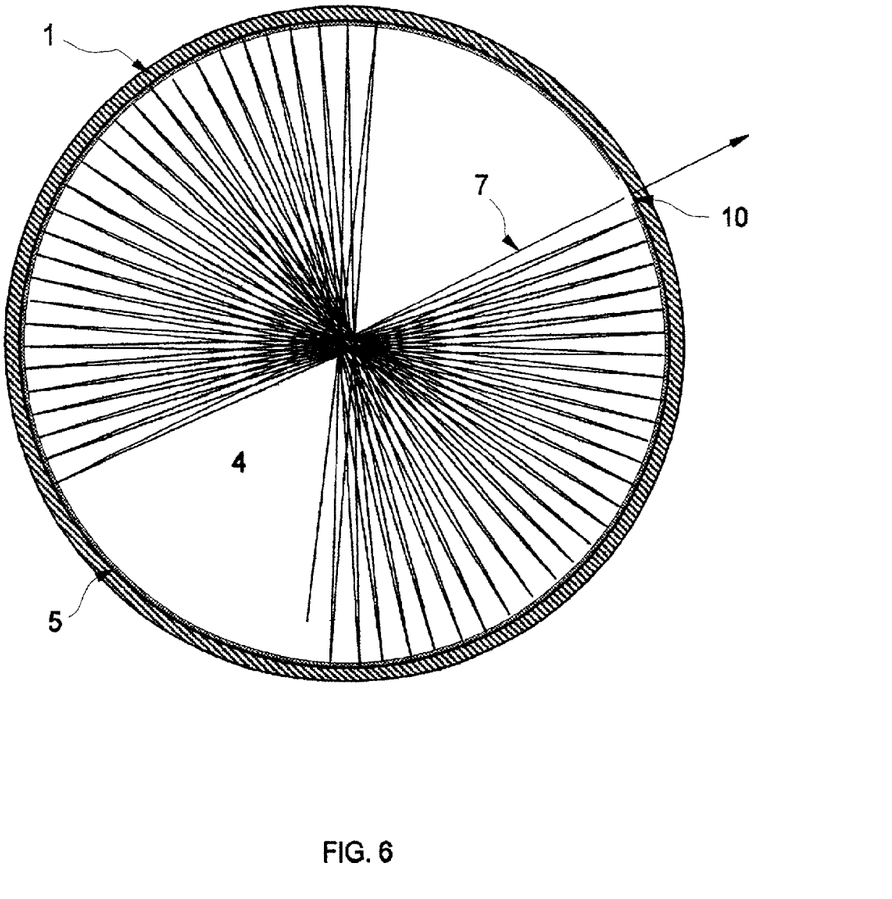
FIG. 6 is a sectional top view of the invention in one of its embodiments, showing laser emission coupled from the edge of the cavity.

In an alternative embodiment of the present invention, laser radiation may also be coupled out of the laser cavity through the edge of the cavity, as in FIG. 6. This latter coupling may be accomplished by selectively removing or preventing the MLD deposition—through etching, masking, etc.—so as to provide an effective aperture (10) through which radiation may transmit. Benefits of the invention, as set forth in the embodiments of FIG. 6, include the ability to combine a high degree of mode selection with an unusually high cavity Q (and commensurately low threshold).

Figure 7:
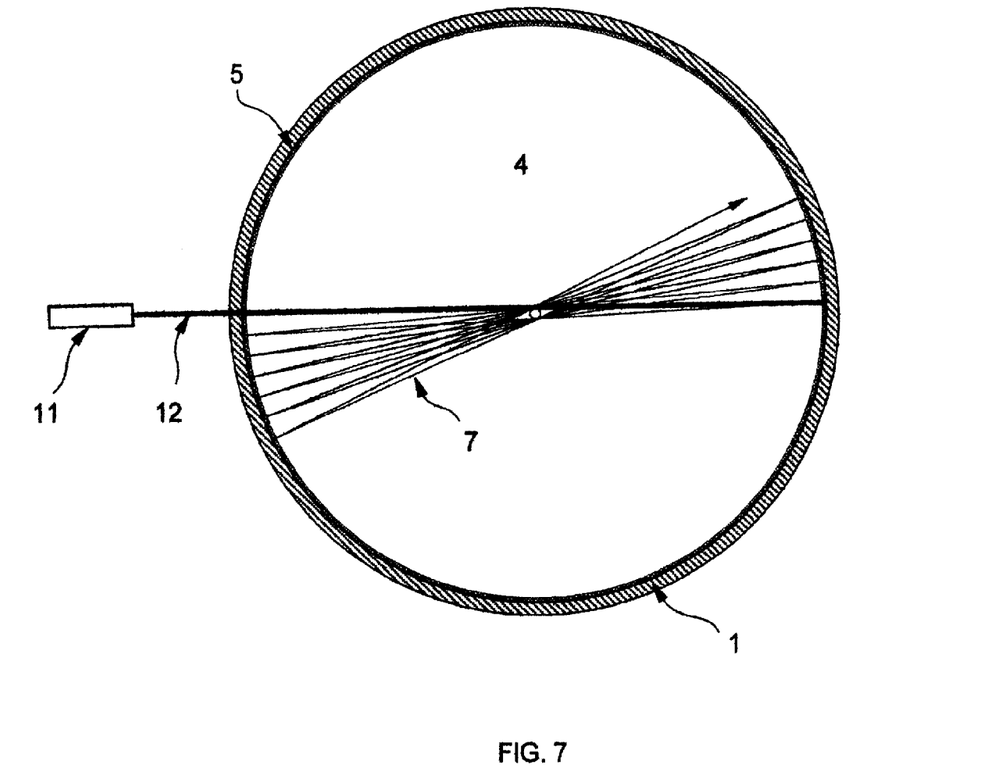
FIG. 7 is a sectional top view of the invention in another of its embodiments, wherein the cavity is pumped by an external light source.

In FIG. 7 is another embodiment of the present invention that allows for edge pumping of the circular cavity. The laser cavities described in the present invention may comprise gas, solid, or liquid gain media, and may be pumped by any of the compatible methods described in the art, such as by a discharge. Also, the present invention allows for a unique method of optical pumping. Because of the reflectance and, inversely, the transmission characteristics of the high-finesse MLD's of the present invention, lasers of the present invention may easily be pumped with laser radiation which corresponds to the peak absorption region of the gain medium's absorption spectrum. It is possible in the present invention to efficiently couple in the pump radiation through the cavity mirror and MLD. In this manner, diode lasers could be positioned around the periphery of the cavity mirror.

It should be noted that, in embodiments of the present invention where the laser cavity is fabricated with a disk-like aspect, thermal stability is typically more easily obtained than in other laser cavities. This latter advantage is due to the ability to effectively heat-sink the cavity through its planar sides—as indicated by dashed lines (18) in FIGS. 4–5—as these surfaces need not be transparent. In fact, these surfaces can possess any of a number of reflecting, absorbing, or scattering characteristics, depending on the application. The ability to heat-sink these cavities can be particularly important in the case that the gain medium is solid state. Heat-sinking, in such a case, may also be performed effectively through the cavity mirror, as long as the outer layers of the cavity mirror are specified so as to prevent any possible TIR of unwanted laser wavelengths. If the laser cavity structure of the present invention is to be operated in an ambient medium which possesses a refractive index, $n_A$, substantially lower than $n_G$, then an absorbing and/or scattering layer is preferably utilized externally to the MLD. This latter use of an absorbing and/or scattering layer serves to prevent specular reflection of unwanted cavity emissions back through the MLD to re-enter the gain volume. Such measures could be implemented in the case that the gain medium is solid state.

It is not intended that the MLD reflector be restricted to the embodiments of FIG. 1, as the latter embodiments are presented primarily for the purpose of teaching the invention. The MLD implemented in a particular embodiment will depend on its particular requirements. The MLD may comprise organic or inorganic materials, or a combination of both. The design of the MLD reflector may vary considerably, as well. For instance, certain layer pairs within the MLD may possess a much higher $\Delta n$ without appreciably increasing the FWHM of FIG. 2. The thin film materials utilized may possess amorphous or crystalline microstructures; and as such, may be optically isotropic, uniaxial or biaxial, depending upon the precise transmission characteristics of the MLD reflector. The MLD reflector may, in some applications, be designed for peak reflectance at a relatively large angle of incidence. Various other functions may also be incorporated into the MLD design, such as an anti-reflection coating, or the transmission of a particular fluorescence peak.

It should also be noted that the embodiments of FIGS. 3–4 do not require that the described spherical cavity laser be restricted to any particular major spherical section. In fact, the cavity structure sectional view of FIG. 4 may as easily describe operation of a cavity structure that is not truncated at all, so that the cavity is a complete sphere. Also, the MLD described herein may, in many circumstances, be deposited on the external surface of the substrate, therein defining the required surface of revolution. In these latter circumstances, the substrate would reside within the cavity interior, and hence would need to be quite transparent to the desired wavelengths. Such a case might be when the required surface of revolution is the external surface of a sphere, which is composed of a laser glass or crystalline material.

The present invention is seen to have potential applications in several areas. One such application would be in the treatment of optical fibers or optical fiber preforms, where the fiber or preform could be passed through the center of a laser cavity similar to that described in FIG. 3. Another potential application could arise in the general field of vapor deposition, where various vapors or gases might be ionized, heated, or otherwise altered by passing through the process volume of FIG. 3.

The preceding description provides an laser cavity structure that may be operated as a laser, optical amplifier, or other, optically resonating, device. Although the present invention has been described in detail with reference to the embodiments shown in the drawings, it is not intended that the invention be restricted to such embodiments. It will be apparent to one practiced in the art that various departures from the foregoing description and drawings may be made without departure from the scope or spirit of the invention.

What is claimed is:

1. A laser apparatus for sustaining lasing cavity modes with an optical radiation of wavelength, $\lambda_0$, comprising:
   a.) cavity structure means providing a surface of revolution, the surface thereby having a circular aspect;
   b.) a reflective coating deposited on the surface of revolution, the coating providing a circular optical cavity, the optical cavity having a cavity interior with an interior index of refraction, the coating including at least one hundred thin film dielectric layers, the layers having alternating refractive indices, the alternating refractive indices at least as great as the interior index, the alternating refractive indices differing by less than 0.1, the coating providing greatest reflectance to the radiation at a preferred angle-of-incidence, so that the coating is substantially reflecting to the radiation only at approximately the angle-of-incidence, such that the radiation only contributes to the modes when the radiation is propagating at approximately the preferred angle-of-incidence;
   c.) a gain medium in the cavity interior, the medium disposed for emitting the radiation into the modes; and,
   d.) pumping means for excitation of the gain medium.

2. The apparatus of claim 1, wherein the gain medium is a gas.

3. The apparatus of claim 2, wherein the medium is pumped by a discharge.

4. The apparatus of claim 1, wherein the gain medium is solid state.

5. The apparatus of claim 1, wherein the gain medium possesses a narrow fluorescence spectrum.

6. The apparatus of claim 1, further comprising a central coupling structure located centrally in the cavity for coupling energy from the cavity.

7. The apparatus of claim 6, wherein the coupling structure includes a substantially conical reflector for directing energy out of the cavity.

8. The apparatus of claim 6, wherein the coupling structure includes a processing structure defining a process space within the coupling structure.

9. The apparatus of claim 8, wherein the coupling structure includes means for introducing a photo-absorbing medium into the process space.

10. The apparatus of claim 8, wherein the coupling structure includes means for passing an optical fiber through the process space for modification of the fiber.

11. The apparatus of claim 8, wherein the coupling structure includes means for passing an optical fiber preform through the process space for modification of the preform.

12. The apparatus of claim 8, wherein the coupling structure includes means for passing a gas through the process space for modification of the gas.

13. The apparatus of claim 1, wherein the coating includes a material with an optical absorption for limiting unwanted propagation in the structure.

14. The apparatus of claim 1, wherein the coating is substantially reflecting to radiation of wavelength $\lambda_1$ only at a second angle-of-incidence, so that the structure may also sustain lasing modes with an optical radiation of wavelength $\lambda_1$.

15. The apparatus of claim 1, wherein the surface of revolution is discontinuous.

16. The apparatus of claim 1, wherein the surface of revolution comprises a spherical surface.

17. The apparatus of claim 1, wherein the surface of revolution comprises a cylindrical surface.

18. The apparatus of claim 1, wherein a selected area on the surface of revolution possesses lower reflectivity for coupling energy out of the cavity through the surface of revolution.

19. The apparatus of claim 1, wherein the reflector is discontinuous.

20. The apparatus of claim 1, wherein angle-of-incidence is approximately normal incidence.

21. A laser structure for sustaining preferred cavity modes with an optical radiation of wavelength, $\lambda_0$, comprising:

a.) cavity structural means, the structural means providing optical surfaces for forming an optical cavity;

b.) a reflective coating deposited on the optical surfaces, the coating providing an optical cavity, the optical cavity having a cavity interior with an interior index of refraction, the coating including at least one hundred-eighty thin film dielectric layers, the layers having alternating refractive indices, the alternating refractive indices differing by less than 0.1, the coating providing greatest reflectance to the radiation at a preferred angle-of-incidence, so that the coating is substantially reflecting to the radiation only at approximately the angle-of-incidence, such that the radiation only provides the modes when the radiation is propagating at approximately the preferred angle-of-incidence; and, c.) a gain medium in the cavity interior, the medium disposed for emitting the radiation into the preferred modes.

22. A gas laser cavity structure for providing lasing cavity modes of a preferred wavelength, comprising:

a.) a cavity structure providing a spherical surface of revolution;

b.) an optical coupling structure located centrally within the cavity; the coupling structure providing means for coupling energy out of the cavity;

c.) a multilayer dielectric reflector deposited on the surface, the reflector defining an optical cavity, the reflector having an angle-dependence, so that the lasing cavity modes are substantially limited to radiation that intersects the coupling structure; and, d.) a gain medium within the cavity, the medium disposed for emitting optical radiation into the lasing modes when the medium is pumped by pumping means.

* * * * *

UNITED STATES PATENT AND TRADEMARK OFFICE
CERTIFICATE OF CORRECTION

PATENT NO.   : 6,807,216 B1
DATED        : October 19, 2004
INVENTOR(S)  : Donald B. Hilliard It is certified that error appears in the above-identified patent and that said Letters Patent is hereby corrected as shown below:

Column 2,
Lines 54-58, please replace

" the reflectance may be described according to:

$$R = \left[ \frac{1 - (n_H/n_L)^{2p} (n_H^2/n_L)}{1 + (n_H/n_L)^{2p} (n_H^2/n_L)} \right]^2 \quad (1)$$

"

with the following:

-- the reflectance may be described according to (Macleod, <u>Thin Film Optical Filters</u>, 1969): --

$$R = \left[ \frac{1 - (n_H/n_L)^{2p} (n_H^2/n_s)}{1 + (n_H/n_L)^{2p} (n_H^2/n_s)} \right]^2 \quad (1)$$

Signed and Sealed this

Twenty-eighth Day of June, 2005

JON W. DUDAS
*Director of the United States Patent and Trademark Office*